United States Patent Office 3,787,559
Patented Jan. 22, 1974

3,787,559
DESULFURIZATION OF WATER-CONTAINING HOT COMPRESSED GASES
Paul Rudolph, Bad Homburg, Ernst Kapp, Frankfurt am Main, Georg Kempf, Budesheim, and Wolf-Rudiger Farana, Frankfurt am Main, Germany, assignors to Metallgesellschaft Aktiengesellschaft, Frankfurt, Germany
Filed Sept. 22, 1971, Ser. No. 182,807
Claims priority, application Germany, Sept. 23, 1970, P 20 46 753.2; Aug. 20, 1971, P 21 41 878.0
Int. Cl. B01d 53/54
U.S. Cl. 423—222       19 Claims

ABSTRACT OF THE DISCLOSURE

In the desulfurization of hot water-containing compressed raw gas, such as is produced by distillation of solid or liquid fuels with air or steam, wherein the raw gas is washed with an absorption agent to remove the sulfur therefrom and leave substantially sulfur-free gas, the improvement which comprises cooling the raw gas prior to desulfurization by heat exchange with condensate produced from said raw gas, the heated condensate resulting from said heat exchange being contacted with clean gas leaving said desulfurization so that said condensate is thereby at least partially revaporized. The absorption agent may comprise an aqueous alkaline solution such as alkali arsenite or an alkali salt of an amino acid, or an alkyl- or alkylolamine. Preferably the raw gas is initially cooled to a temperature below that at which it is contacted with the absorption agent.

---

In the combustion of liquid or solid fuels the sulfur compounds contained therein enter the flue gas as $SO_2$ and in part also as $SO_3$, and pass with the flue gas into the atmosphere.

Because of the large volume of fuel involved it is impractical to keep the sulfur compounds out of the atmosphere by processing solid fuels or heavy oils; only processes for desulfurization of the flue gases resulting from combustion are practical.

Many processes are known and in use for the removal of $SO_2$ and $SO_3$ from flue gases. They do not yet represent an ideal solution to the problem because the sulfur oxides in the flue gases are greatly diluted owing to the nitrogen content of the air, so that large quantities of gas have to be handled.

On the other hand, the desulfurization of fuel gases in which the sulfur content is largely present in the form of hydrogen sulfide is much simpler. A great number of methods are known for washing acid components, especially hydrogen sulfide and carbon dioxide, out of fuel gases or synthesis gases, and they have a long history of development.

Gases which are produced from solid or liquid sulfurous fuels by gasification with oxygen or air and with steam contain the sulfur bound in the fuel mainly in the form of hydrogen sulfide. More than 97% of the sulfur content of gases produced by the pressure gasification of coal is present in the form of hydrogen sulfide. In regard to the achievement of a sulfur-free flue gas, the gasification of a sulfur-containing fuel and desulfurization of the hydrogen sulfide-containing gasification product offers a number of appreciable advantages over direct burning followed by desulfurization of the sulfur dioxide-containing flue gas.

This is the case, for example, with power plants driven by gas turbines in comparison with conventional steam power plants. In the case of a propellant gas for gas turbines not only the heat value but also the sensible heat as well as volume and temperature and the mass have to be utilized, and therefore it becomes desirable to produce such propellant gases by the distillation of coals or oils with air and steam. In any case, the raw gas flowing from the gas producer, after the separation of dust and heavy hydrocarbons or carbon black in washing towers or the like, has a temperature of 140 to about 200° C. and a considerable water vapor content. Before this gas can be desulfurized it has to be further cooled in order to separate any condensable substances which it contains and which have to be kept out of the desulfurizing system, and in order to bring the gas to the proper temperature for desulfurization. This, however, results in the loss not only of the sensible heat of the gas but also the steam volume and in some cases even the heating value of the substances removed by condensation.

It is the object of the invention to prevent these energy losses insofar as possible or at least to reduce them substantially.

This object is achieved by the invention by cooling down to the absorption temperature the hot vapor-containing gas which is to be desulfurized, doing so by direct or indirect heat exchange with a liquid, and bringing the liquid which is thus heated into heat exchange with the purified gas, and then bringing it again into a heat exchange with the gas that is to be cooled.

Such condenser-saturator liquid circulation systems are known, especially from processes for the conversion of carbon monoxide with steam to carbon dioxide and hydrogen, in which the saturator output is fed to the conversion reactor in order to concentrate and preheat the gas for the steam conversion. The water brought into contact with the gas in the saturator is obtained in the condenser following the conversion reactor in heated liquid form consisting partially of condensate, and it circulates through the condenser and the saturator.

In the processes of the invention, the condenser precedes the gas desulfurization washer, while the saturator follows it. With this arrangement it is brought about that the vapors which condense out during the cooling of the raw gas for desulfurization and the heat contained in the coolant liquid and condensate can be fed back to the purified gas. To prevent any condensable substances in the raw gas from getting into the sulfur compound absorption system it is sufficient to cool the raw gas approximately to the operating temperature of the desulfurization system. The condensate that is thus produced is removed as completely as possible before the raw gas enters the desulfurization system.

The process of the invention is applicable to the desulfurization of hot compressed gases containing water vapor and in some cases hydrocarbon vapors and produced by the distillation of solid or liquid fuels with air and steam.

The process of the invention is characterized by the fact that the hot raw gas is cooled prior to desulfurization by heat exchange with self-condensate obtained therefrom, and that the self-condensate that is thus heated is brought into contact with the cold clean gas, being thus revaporized at least in part. The raw gas is thus cooled down to a temperature not more than 10° C. above the operating temperature of the desulfurization system and preferably lower than the operating temperature, and is separated from the condensate that is formed.

The cooling of the raw gas can be performed in one stage or in several stages. In the first or only stage, the self-condensate can be brought into direct heat exchange with the hot raw gas and the hot condensate can be degassed, prior to contact with the raw gas if desired, by purging and stripping with steam or a sulfur-free gas, such as the clean gas, any dissolved hydrogen sulfide also being driven off.

The hot raw gas, however, can also be cooled in at least one stage by indirect heat exchange with self-condensate, and the condensate thus heated can be brought in contact with the clean gas within the saturator system in at least one stream, while the condensate taken from the indirectly cooled raw gas can be added at least in part to the condensate circulating as coolant through the condenser and saturator.

If the condensate contains sulfur compounds it can be degassed, e.g., by purging and/or by stripping with steam with additional indirect heating if desired and freed of dissolved sulfur compounds prior to delivery to the saturator or prior to introduction into the condensate circuit. The stripping gas is mixed with the acid exhaust gas from the desulfurization system.

The self-condensate serving as the heat exchange agent, and to which fresh water is added if necessary, can be carried in one circuit or in a plurality of circuits through a singlestage or multistage saturator system receiving the output of the desulfurization system. Hydrocarbons contained in the condensate are separated by stratification and brought into contact with the pure gas, preferably at the hottest point of the saturator system. On the other hand, excess amounts of condensate can be ejected at the coldest point in the circuit.

If the condensing system is constructed as a multistage system it may be desirable to carry the gas through the condensing system together with the condensate formed in the individual stages. This can also be done with a counterflow by directing all of the condensate that is produced against the gas that is to be cooled. This results in a better utilization of the sensible heat of the condensate and, especially in the case of gases containing hydrocarbons, a better washing action by the condensate on substances contained in the gas which might be harmful in the desulfurization system that follows.

The first stage of the condensing system can be in the form of a conventional washing cooler in which the raw gas is brought into contact with the condensate obtained therefrom. The condensate removed from the gas is then increased by the amount of cooling liquid used, which signifies a greater expense in degassification by purging and steam stripping. Furthermore, the condensates from the cooling stages may contain liquid hydrocarbons which can be separated from the condensate and which are to be at least partially recycled into the clean gas in the saturator.

It is desirable for the very first stage of the condensing system to be constructed as an indirect condenser in which the condensate is produced without being mixed with the coolant liquid.

Just as the condensing system is divided into a plurality of stages, the saturator also is a multistage system, so that it will be able to make use of the coolant streams produced at various temperature levels in the condensing system, and also in order to obtain a hot saturator stage in which hydrocarbons contained in the coolant condensate can be re-vaporized.

Fundamentally, the principle of re-vaporizing part of the hot condensate taken out of the raw gas and putting it back into the cold clean gas by direct contact and reheating it can be applied to any desulfurization process.

The higher the temperature at which the desulfurization is performed, the better will be the efficiency of the process of the invention, because then the amount of heat to be eliminated and the amount of vapor to be condensed will be smaller. On the other hand, in the case of raw gases which are rich in carbon dioxide and sulfur compounds, for example, it may be advantageous to perform the desulfurization at a low temperature, e.g., at ambient temperture, using an absorption agent that is selective for $H_2S$ over $CO_2$, in order to obtain from it upon regeneration an exhaust gas rich in $H_2S$ and to leave in the clean gas as much as possible of the high $CO_2$ content of the raw gas.

In adapting the condensing and saturating system to the desulfurization method selected, care must be taken to see that, in the distillation of liquid fuels, e.g., heavy mineral oil fractions, tars or tar oils, with oxygen-containing gases and water vapor in general, a gas virtully free of condensable hydrocarbons is formed, from which only water vapor is to be removed in the condensation, whereas the pressure gassification gases produced from coal do contain condensable hydrocarbon vapors in addition to the water vapor.

The absorption agent from which $H_2S$ is recovered as exhaust gas in the regeneration process can be solvents which act physically, e.g., high-boiling organic solvents with a great ability to dissolve hydrogen sulfide, examples being N-methylpyrrolidone, propylene carbonate, etc. If the pressure of the raw gas is sufficiently high, water can also be used as a physical absorption agent for hydrogen sulfide at temperatures up to more than 100° C.

Organic aliphatic bases of low volatility, alkylamines and alkanolamines, containing water in some cases, can be used as chemically acting absorption agents at absorption temperatures up to 160° C. Lastly, aqueous solutions of alkali salts of weak inorganic or organic acids can also be used, examples being alkali carbonate solutions, at temperatures up to about 160° C., or solutions of alkali salts of simple amino acids which preferably are suited for the selective absorption of $H_2S$ over $CO_2$ at temperatures from 20 to 60° C.

The heat that is recoverable from the hot raw gas by the process of the invention can also be used to supply the heat required for the regeneration of the absorption solution circulating in the desulfurization system.

The non-reversible processes in which the hydrogen sulfide is not driven out as such but is transformed by oxidation into elemental sulfur are also suitable for the absorption of hydrogen sulfide in liquid absorption agents at higher temperatures up to about 160° C. Such a process is, for example, the arsenite-arsenate process (German Pat. 1,143,603) or the reaction of hydrogen sulfide with sulfur dioxide to produce elemental sulfur and water vapor in a liquid phase consisting, for example, of molten sulfur (U.S. Pat. 3,447,903) or a high-boiling solvents such as a neutral phosphoric acid ester (French Pat. 1,492,013). These processes are selective for hydrogen sulfide as a result of the reaction mechanisms used.

The particular desulfurization process used will determine if the raw gas should first be cooled below the absorption temperature to remove water vapor therefrom. Absorption agents containing water can absorb water from the raw gas without harm, because it is re-vaporized in the regeneration. In this case it is sufficient to cool the raw gas down to slightly above the absorption temperature. In the case of absorption agents having a low, limited water content, e.g., in the case of the organic solvents and bases, the raw gas is cooled down to at least the anticipated absorption temperature, or preferably even lower. In a number of other desulfurization processes it may be advantageous to put heat into the absorption, e.g., by heating the absorption agent, after regeneration in some cases, to a temperature above the condensation temperature achieved. This is the case, for example, with the previously mentioned irreversible processes of the prior art, in which the regeneration is based on oxidation brought about by aeration and may be combined with a cooling process, and also with the desulfurization of the raw gas with the addition of $SO_2$ by means of the Claus reaction in the liquid phase, the liquid phase consisting of molten sulfur. Here the sulfur must be kept liquid by the input of heat, on the one hand, and on the other hand there is no regeneration because the reaction product of the desulfuration is elemental sulfur which is removed from the melt as an excess.

Another possibility involves first carefully separating condensate from the cooled raw gas and then subjecting the cooled gas to indirect heat exchange to raise its temperature to, or slightly above, the absorption temperature for desulfurization; the indirect heat exchange may be effected with the hot raw gas or the hot exhaust gas of a turbine.

The process of the invention serves preferably for the preparation of fuel gases which are produced under high pressure of up to about 50 atmospheres by the distillation of solid fuels, e.g., coal, or liquid fuels such as heavy oils, residual oils or tars, by means of air and steam, for use in power plant processes using gas turbines, possibly in conjunction with a steam power process.

This process differs from the purification of synthesis gases in that it is the desulfurization that is particularly important, while the volume, the heat content and the heating value of the hot raw gas are to be preserved insofar as possible.

To maintain the volume, the carbon dioxide is to remain in the clean gas insofar as possible, and the water removed by condensation is to be partially re-vaporized back into the clean gas.

The re-vaporization of the condensate also serves for the maintenance of the heat content. The re-vaporization of hydrocarbons that condense out serves to maintain the heating value.

The sulfur content of the raw gas including the hydrocarbons contained in vapor form therein is diminished by the process of the invention to approximately $\frac{1}{10}$ in the clean gas.

For a given permitted sulfur emission in the flue gas, coal or heavy oil containing ten times the amount of sulfur can be used in power plant processes by means of the processes of the invention. This means that, even in the case of stringent exhaust gas requirements, nearly all sorts of coal or qualities of oil, with only a few extreme exceptions, become usable in the power economy.

The flow diagrams of a number of embodiments of the invention are represented in the drawings.

The installation shown in FIG. 1 contains a one-stage condenser-saturator system with an indirect cooler.

Like reference characters in different figures have reference to the same structures.

Figure 1:
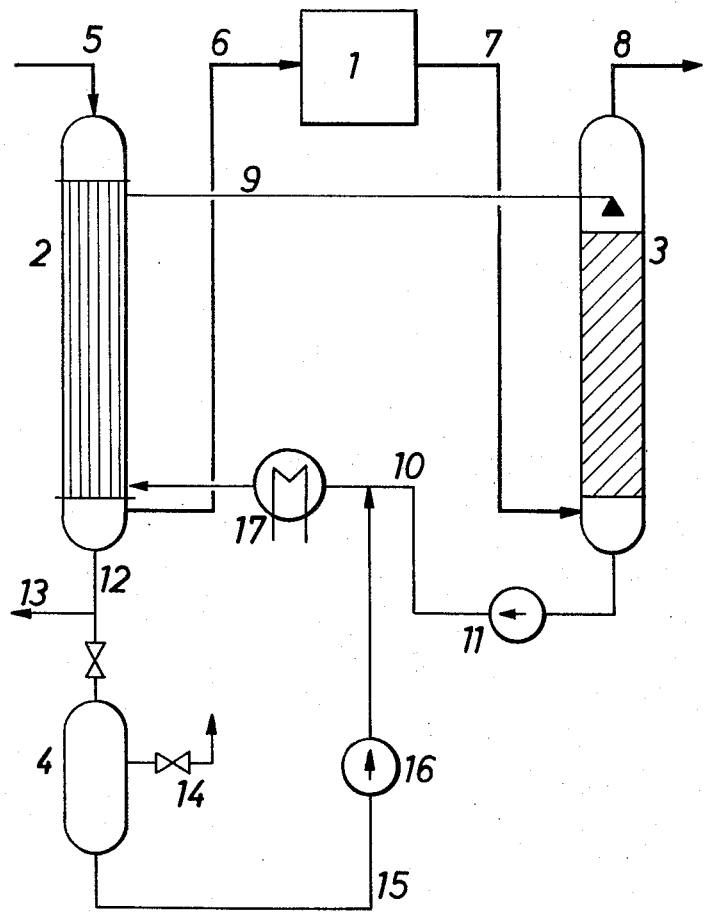

The installation shown in FIG. 1 consists essentially of any desired desulfurization system 1, the condenser system 2, the saturator system 3 and an expansion tank 4.

The raw gas, which has been freed of soot or tar in a washing cooler, has a temperature of 150 to 200° C. and is saturated with vapors of water and possibly hydrocarbons. It passes through the line 5 into the indirect cooler 2 and flows in line 6 to the desulfurization system 1. From there cleaned gas flows in line 7 to the saturator 3, which is in the form of a sprinkling tower, for example. The clean gas, heated and enriched with vapors leaves the saturator through line 8. Condensate taken from the gas and collected is kept circulating through the indirect cooler and the saturator. Hot condensate flows in line 9 from the condenser 2 to the saturator 3 and delivered to the top of the latter. Cooled condensate is returned from the sump of the saturator through line 10, by means of the pump 11, to the bottom end of the heat absorbing side of the indirect cooler 2.

Condensate separates from the hot raw gas flowing through the heat yielding side of the indirect cooler and gathers in the sump, and it is carried in line 12 to an expansion tank 4 with the relief or purging valve 14. Gases dissolved in the condensate can here be stripped out by expansion. This condensate is carried in line 15 to the pump 16 which feeds it into line 10, combining it with the hot condensate flowing therein from the saturator 3. The excess condensate that forms is tapped from the circuit at an appropriate point 13. In order to obtain an adequate temperature difference between the condensate flowing into condenser 2 through line 10, and the gas flowing out of it through line 6, a heat exchanger 17 is disposed in line 10 by which heat is removed from the condensate and utilized at another point in the process, e.g., in the regeneration of the charged absorption solution. On the other hand, a heat exchanger which is not shown can be provided in line 9 for the purpose of further heating the hot condensate coming from the condenser 2, before it reaches the saturator 3.

Figure 2:
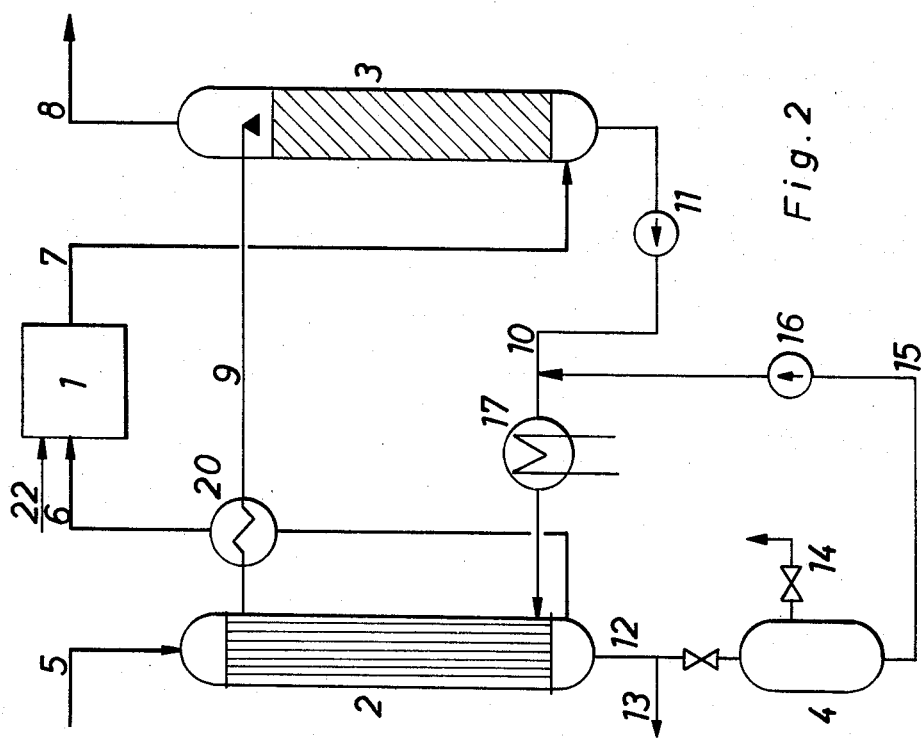
FIG. 2 is an expanded version of the embodiment in FIG. 1 using indirect heat exchange between the cooled gas and the condensate heated in the condensing system.

FIG. 2 is substantially the same as FIG. 1, the same reference numbers relating to the same parts. In order to produce a state of hyposaturation in the raw gas with reference to the absorption temperature in the desulfurization system, the temperature of the gas that has been cooled and freed of condensate is raised in this embodiment. For this purpose a heat exchanger 20 is provided in lines 6 and 9, in which the cooled raw gas, separated from the condensate, is heated by the hot stream of condensate flowing from condenser 2 to the saturator 3.

Figure 3:
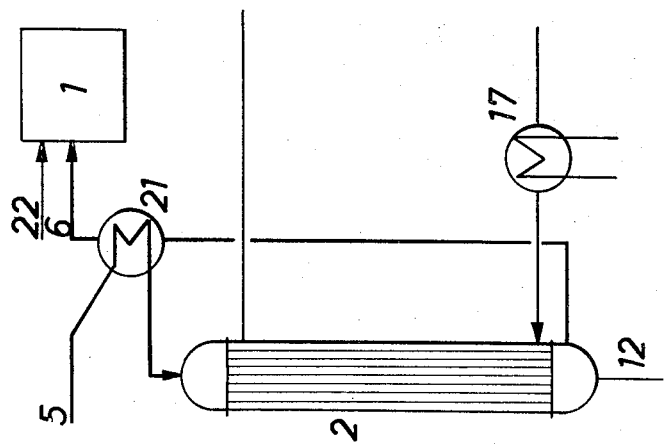
FIG. 3 is a modification of the embodiment in FIG. 2 using indirect heat exchange between hot raw gas and cooled raw gas.

In the installation represented in FIG. 3, this procedure is modified in that the raw gas, cooled and separated from the condensate, is heated by heat exchange with hotter raw gas flowing into the condenser. FIG. 3 is a portion of FIG. 2, in which the same reference numbers are used. The hot raw gas in line 5 and the raw gas in line 6, which is poorer in water vapor, and in hydrocarbons where hydrocarbons are involved, flow through the heat exchanger 21. In this case the hot raw gas flowing in line 5 can come directly from the washing cooler of the preceding gas generating plant or, in the case of the plant to be described with reference to FIG. 5, which uses a multi-stage condensing system, it can come from a preceding condensing stage.

An embodiment based on FIG. 2 or 3 is especially appropriate for desulfurization by the Claus reaction. The sulfur dioxide needed for the purpose is introduced into the desulfurization system through line 22.

Figure 4:
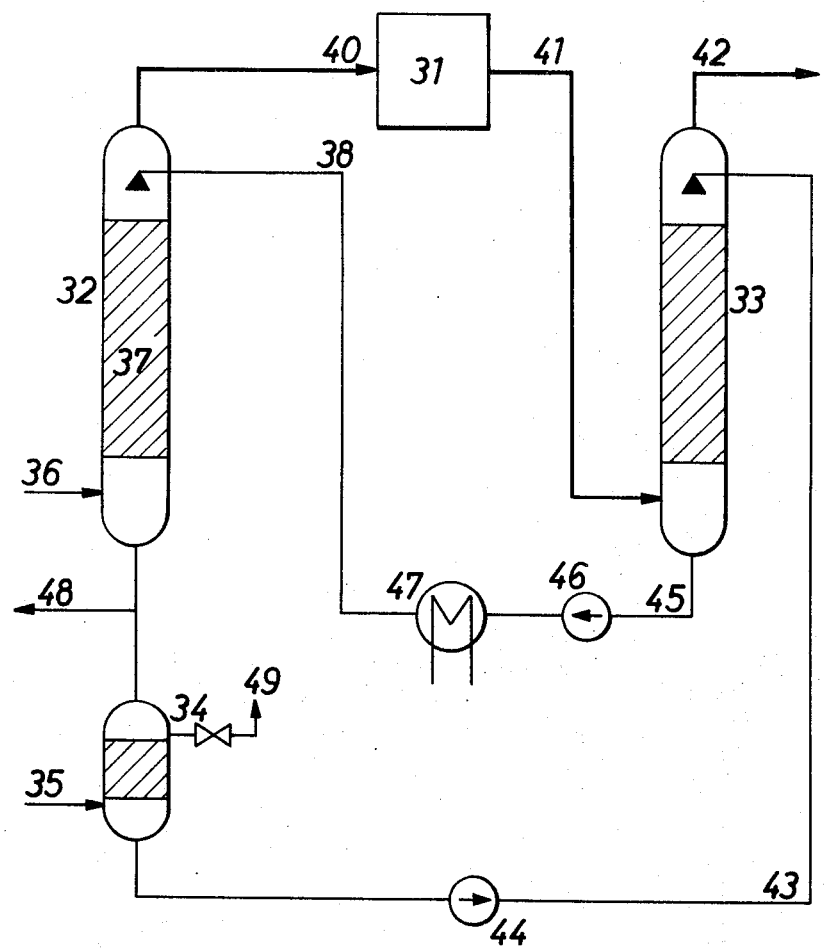
FIG. 4 is a modification of the embodiment in FIG. 1, in which the condenser system is in the form of a washing cooler with direct heat exchange between raw gas and condensate.

In the embodiment represented in FIG. 4, the condenser system preceding the desulfurization system is constructed as a washing cooler with direct heat exchange between hot raw gas and the condensate obtained therefrom.

The apparatus consists essentially of the desulfurization system 31, the washing cooler 32, the saturator 33 and the stripping tank 34 with the steam feed line 35 and the discharge line 49.

The hot raw gas flows through line 36 into the direct cooler 32 and in the latter it flows upward through packing 37 or other suitable means to the condensate being delivered from line 38 by means of a spreading device 39. The gas then flows in line 40 to the desulfurization system 31. From the latter the clean gas flows in line 41 to the saturator 33 which is in the form of a sprinkling tower as it was in FIGS. 1 and 2. The clean gas flows from the saturator through line 42 at an elevated temperature, saturated with vapor. The wash liquid, increased in volume in the direct cooler 32 by the condensate that is formed, is collected in the stripping tank 34, freed of dissolved gases by purging and/or by the injection of steam, and then pumped in line 43 by means of pump 44 to the heat of the saturator. From the sump of the saturator the cooled condensate is returned in line 45 by means of the pump 46 through the heat exchanger 47, (to bring about the required temperature difference) to the direct cooler 32. Excess condensate is carried out through line 48.

In this procedure all of the condensate passes through the condenser and the saturator and accordingly it all has to be degassed in the stripping tank 34. In conjunction with the direct cooler 32, therefore, the stripping tank 34 acquires a greater importance than the stripping tank 4 in the embodiments shown in FIGS. 1 to 3. The small amounts of $H_2S$ which may be carried out of the condensing system into the saturator system by the condensate degassed in this manner are negligible if the clean gas is used as a propellant gas for a gas turbine.

Figure 5:
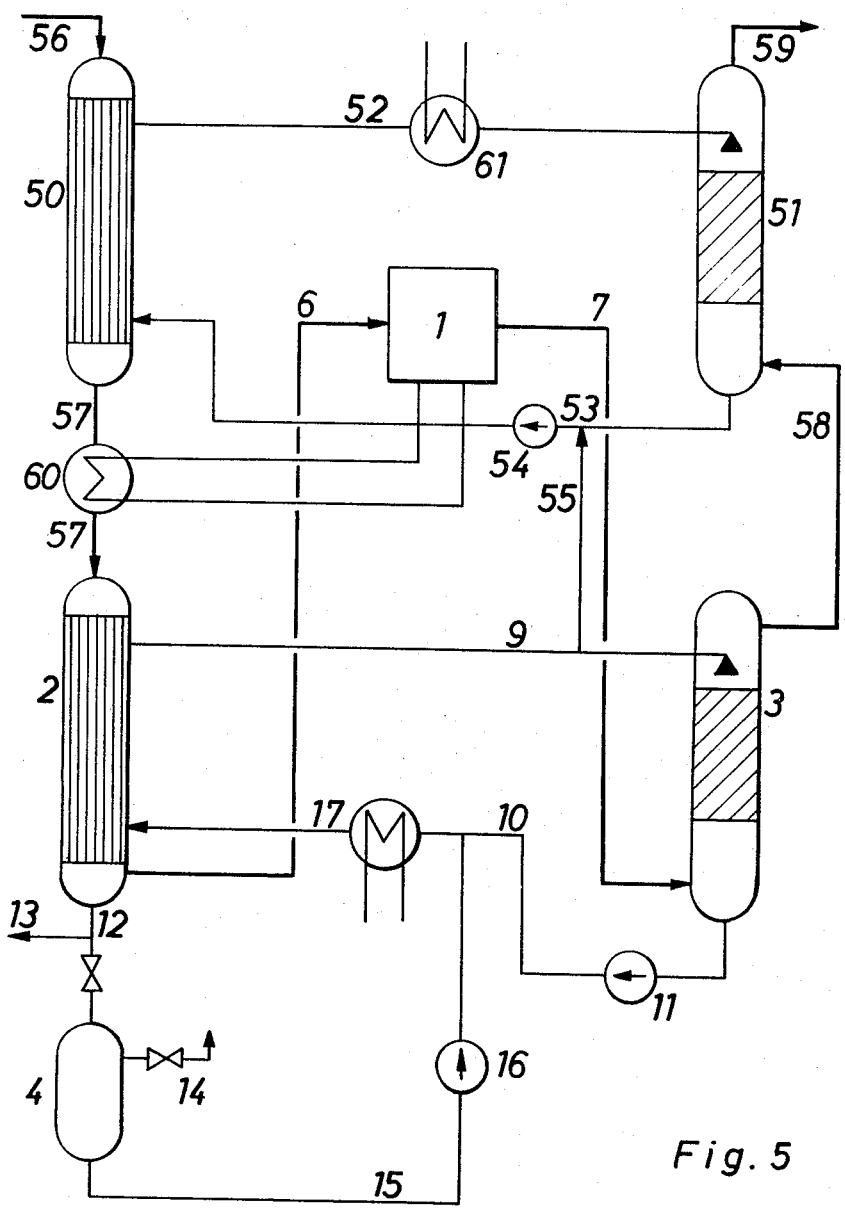
FIG. 5 is a flow diagram of an installation with a multi-stage indirect cooling system and a multistage saturator system.

In the embodiment shown in FIG. 5, the cooler-saturator system associated with the desulfurization process is of a two-stage design. As regards the desulfurization system and the cooler and saturator used directly ahead of and behind it, the flow diagram is the same as that in FIG. 1, and to this extent the same reference numbers are used. This identity includes the desulfurization system 1, the condenser 2, the saturator 3 and the expansion tank 4.

An additional condenser 50 is connected to the input of condenser 2, while an additional sprinkling tower 51 is connected to the output of the saturator 3. A circulation of condensate is maintained in lines 52 and 53 and through condenser 50 and saturator 51 by means of the pump 54. The volume loss produced in saturator 51 by evaporation is compensated through line 55 from the condensate circulating through the condenser 2 and the saturator 3. The volume loss that occurs in the latter is made up from the condensate that is being produced (line 15, pump 16).

The hot raw gas flows from line 56 through the first condenser 50 and through the connecting line 57 into condenser 2, and then, in the manner described in connection with FIG. 1, it flows in line 6 to the desulfurization system and from there through line 7 to the saturator 3. From the latter the heated clean gas flows through connecting line 58 to the second saturator 51, and thence it is delivered through 59 to the point of utilization.

A heat exchanger 60 is inserted into the line 57 interconnecting the condensers 50 and 2, for the purpose of maintaining a sufficient temperature difference in the circulation betwen condenser 50 and saturator 51. By means of a fluid, heat is removed by this heat exchanger and can be transferred to one of the steps of the desulfurization process, e.g., to the regeneration of the charged absorption solution. In addition, heat can be delivered by a heat exchanger 61 to the condensate stream from the condenser 50 to the saturator 51.

The condensate from the condenser 50 is carried through the heat exchanger 60, and the condensates from condenser 50 and heat exchanger 60 are carried together through the condenser 2.

Figure 6:
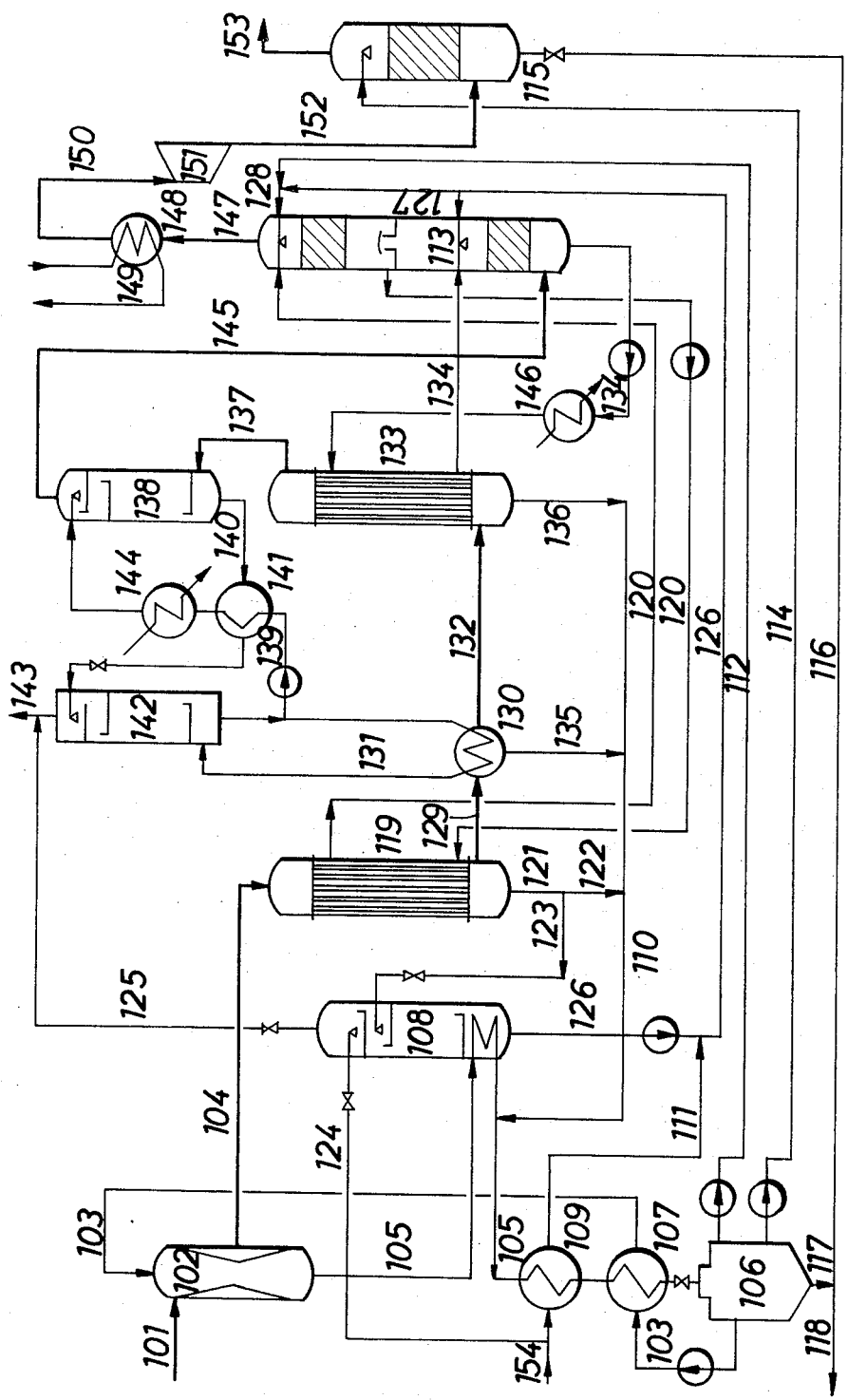
FIG. 6 is the flow diagram of an installation for the desulfurization of a tar-containing raw gas produced by the pressure distillation of coal with air and steam, which operates through the selective washing out of the hydrogen sulfide with an aqueous solution of alkali salts of simple amino acids known by the trademark name "Alkazid."

The embodiment shown in FIG. 6 contains a multi-stage raw gas cooling system and a two-stage system for saturating the clean gas. It is preferentially suited for the treatment of raw gases containing condensable hydrocarbons, such as raw gases containing tar from the pressure gassification of coal with air and steam.

The plant consists essential of the gas desulfurization system with the absorption tower 138 and the regeneration tower 142, the raw gas coolers 119, 130 and 133, the two-stage clean gas saturator 113, and the stripper 108 for degassing the condensate formed in the coolers. The flow diagram also contains the washing cooler 102 with tar separator 106 commonly used in pressure distilling apparatus for coal.

The cleaned gas is put through a reheater 148 and then through the impulse turbine 151 in which it expands to a lower pressure, performing work. The partially expanded, still hot gas is carried through the resaturator 115 where it is enriched with vaporizable hydrocarbons from the tar separator 106, and finally it is fed through line 153 to the combustion chamber of a gas turbine. The exhaust gas from the gas turbine can afterward be delivered to a steam power process.

The raw gas produced from coal by gassification under elevated pressure with air and steam, in which the sulfur is present almost entirely in the form of hydrogen sulfide, passes through line 101 into the washing cooler 102. It is washed with self-condensate from the line 103, this self-condensate being drawn from the separator 106 and preheated in the heat exchanger 107, the raw gas being saturated with water vapor according to its pressure and temperature. Solids are bound by higher boiling hydrocarbons in the condensate and removed with excess water through line 105. The water with the condensed hydrocarbons and solids is carried in line 105 through a reboiler in stripper 108, then mixed with other condensates from line 110, cooled further in heat exchanger 109 with water from line 111, and carried through the heat exchanger 107 into the separator 106 where tar and water separate by stratification. Light hydrocarbons are fed through line 112 to the saturator 113 and vaporized into the clean gas. The heavier hydrocarbons in line 114 are fed to the tar saturator 115 where they are vaporized at lower pressure into the partially expanded clean gas. The residual fraction is combined in line 116 with the mixture of solids and tar which is taken from separator 106 through line 117, and returned through line 118 to the gas producing system, which is not shown. There the tar is cracked, while the organic sulfur compounds contained in it are also partially transformed into hydrogen sulfide.

The water vapor saturated raw gas is fed through line 104 to the indirect cooler 119 and yields a portion of its sensible heat to the circulating water in line 120, which heats the clean gas in the second stage of the saturator 113.

The condensate removed in condenser or cooler 119 is taken out through line 121 and partially recycled through line 122 to the washing cooler circuit (lines 110 and 105). The remainder, which in this example corresponds to the amount of water vapor in the raw gas, is fed through line 123 to the stripper 108. By means of heat from the hotter condensate (line 105), and by pressure reduction if desired, $H_2S$ and $CO_2$ are driven out in the stripper 108 and delivered through line 125 to the exhaust line 143 at the regeneration tower 142. In the stripper 108 small amounts of ammonia contained in the raw gas are also driven off, but washed back with a small additional amount of water from the line 124. The degassed condensate from the stripper 108 is fed together with additional water from line 111 to the saturator 113 and divided by means of lines 127 and 128 between the two stages thereof.

The precooled raw gas passes through line 129 to the reboiler 130 of the regeneration tower 142 and there it heats the absorption solution used in the gas desulfurization which is carried by line 131 through the reboiler 130. From the reboiler 130 the gas flows in line 132 to the indirect final condenser 133 which is connected through the cooling water circuit 134 to the first stage of the saturator 113.

From the reboiler 130 and the final condenser 133 the condensates are returned through lines 135 and 136 to the gas water circuit (line 10).

The cooled raw gas, containing hydrogen sulfide, passes through line 137 into the absorption tower 138 in which it is washed with a suitable absorption solution with a short time of contact so as to wash the hydrogen sulfide out of the raw gas as selectively as possible.

The charged absorption solution is fed through line 140 to the regeneration tower 142 and heated in heat exchanger 141 by means of the hot regenerated solution in line 139. By the input of heat from the reboiler 130 and by the relief of pressure the absorbed acid gases are purged out and carried through line 143 to a process whereby they are made into sulfurous commercial products. The hot regenerated absorption solution is returned in line 139 through the heat exchanger 141 and the condenser 144 to the heat of the absorber 138.

The desulfurized clean gas is fed through line 145 to the saturator 113. In the first stage, which is connected to the indirect cooler 133 by means of the cooling water circulating in line 134, the clean gas is sprinkled with the heated cooling water. The water that evaporates is replaced from line 127. The cooling water circulating in line 134 is carried through the cooler 146 in which excess heat is removed. The clean gas, saturated according to its pressure and temperature, enters the second stage of saturator 113, where it is sprinkled with the warm water from the condenser-saturator circuit running through lines 120.

The amount of heat transferred from the condenser to the saturator often suffices to cover the heat requirements of the regeneration of the absorption solution, and to saturate the clean gas beyond the water vapor content of the raw gas. In the saturator 113, make-up water from line 111 as well as lighter hydrocarbons from line 112 are injected and vaporized through line 128 in addition to the excess condensate from line 126.

The clean gas leaves the saturator 113 after being saturated according to its temperature and pressure and passes through line 147 into the superheater 148 where it is superheated, e.g., by flue gas from line 149. In line 150 the superheated gas is fed to turbine 151 where it is partially expanded to perform work and then it passes through line 152 into the tar saturator 115. Here the higher hydrocarbons, which are drawn from the tar separator 106 and brought in through line 114, are injected at a lower pressure level. The non-vaporized fraction is carried out of tar saturator 115 through line 116 and recycled to the gas producer. After the partial expansion the desulfurized clean gas in line 153 is still available under pressure for a gas or a gas and steam power process.

The condensate circuits serving for the transfer of heat from the hot raw gas to the cold clean gas run through lines 120 and 134. The closed circuit pipe line 120 connects the condenser 119 to the upper part of the two-stage saturator 113, while the closed circuit line 134 connects the condenser 133 to the bottom section of saturator 113.

The invention is further described in the following illustrative examples.

EXAMPLE 1

This example relates to a desulfurization of moist gas produced by countercurrent distillation of coal with air under pressure, which operates by washing with molten sulfur according to U.S. Pat. 3,447,903. Although the desulfurization takes place at temperatures of 120 to 160° C., the gas first has to be cooled down below these temperatures in order to diminish the $H_2O$ content, since water, an end product of the desulfurization reaction, interferes with that reaction.

The procedure will be explained hereinbelow with reference to FIG. 2 and to the variant shown in FIG. 3.

The raw gas, which in the process of its production has been subjected to wet washing and is saturated with water vapor, is fed through line 5 to the heat exchanger 21 and to the condenser 2. It consists of 180,000 Nm.³/h. of dry gas of the following analysis:

| | Percent |
|---|---|
| $CO_2$ | 13.0 |
| $H_2S$ | 1.0 |
| CO | 15.8 |
| $H_2$ | 25.0 |
| $CH_4$ | 5.2 |
| $N_2$ | 40.0 | and it contains 68,400 kg./h. of water vapor, 7,920 kg./h. of vapors of tar oil, benzine and other hydrocarbons along with $NH_3$. The pressure amounts to 21 atmospheres absolute, and the temperature is 161° C. The calorific value (with reference to $H_u$) amounts to $365.9 \times 10^6$ kcal./h., the sensible heat to $14.56 \times 10^6$ kcal./h., and the heat of evaporation of the water vapor content to $40.83 \times 10^6$ kcal./h.

In heat exchanger 21, $0.77 \times 10^6$ kcal./h. are used in reheating the cooled gas. In condenser 2, $45.98 \times 10^6$ kcal./h. are removed, of which $39.53 \times 10^6$ kcal./h. are absorbed from the condensate being fed through line 10 to condenser 2 and leaving the latter through line 9, while the remainder is taken out with the condensate through line 12. The temperature of the raw gas has thereby been reduced to 90° C. and it then contains only 5,223 kg./h. of water vapor plus 2,700 kg./h. of tar oil and other hydrocarbons.

After re-heating in heat exchanger 21, the raw gas is fed through line 6 to the desulfurization system 1. The gas contains 1,800 Nm.³/h. of $H_2S$, of which 95%, or 1710 Nm.³/h., reacts in the desulfurization process according to the Claus reaction: $2H_2S + SO_2 \rightarrow 3S + 2H_2O$. This requires 855 Nm.³/h. of $SO_2$, which is produced by stoichiometric combustion of sulfur with air. The 4,075 Nm.³/h. of hot combustion gas thus produced, containing 21% $SO_2$ and 79% $N_2$ is fed through line 22 to the desulfurization ssytem 1 and brings $2.50 \times 10^6$ kcal./h. of sensible heat into the desulfurization, so that the gas mixture entering the desulfurization tower reaches a temperature of 139° C. Through the heat of reaction the temperature is raised still further, so that the gas leaves the desulfurization system through line 7 at 155° C. The $H_2O$ that forms in the reaction increases the water vapor content to 6,597 kg./h. in the clean gas, so that the saturation temperature amounts to 95° C. The addition of $SO_2 + N_2$ and the reaction of $H_2S$ and $SO_2$ changes the quantity of dry gas to 181,510 Nm.³/h.

In the desulfurization process, 3,660 kg./h. of sulfur is formed, of which 1,220 kg./h. has to be burned to $SO_2$ so that 2,440 kg./h. of usable molten sulfur can be recovered.

The clean gas passes into saturator 3, which is connected to condenser 2 by the condensate circuit through line 10 with pump 11 and heat exchanger 17 and through line 9. In this saturator the clean gas is heated and saturated, so that it is available from line 8 at a pressure of 19.5 atmospheres absolute and a temperature of 145° C. for use in a gas turbine, for example. It then consists of 181,510 Nm.³/h. of dry gas of the following analysis:

| | Percent |
|---|---|
| $CO_2$ | 12.89 |
| $H_2S$ | 0.05 |
| CO | 15.67 |
| $H_2$ | 24.79 |
| $CH_4$ | 5.16 |
| $N_2$ | 41.44 | and it contains 40,840 kg./h. of water vapor, 7,920 kg./h. of tar oil and benzine, $NH_3$ and other hydrocarbons. Thus 34,243 kg./h. of water as well as the hydrocarbons and ammonia are revaporized in the saturator into the clean gas. The clean gas then has a calorific value (with reference to $H_u$, i.e. lower heating value) of $356.10 \times 10^6$ kcal./h., sensible heat $11.34 \times 10^6$ kcal./h. and water evaporation heat $24.38 \times 10^6$ kcal./h.

The condensate lost by evaporation is replaced by condensate from condenser 2, which is introduced through line 12, expansion tank 4 and through line 15 and pump 16 into line 10. Since a total of 63,177 kg./h. of condensate is produced in condenser 2, 28,934 kg./h. still has to be removed through line 13. It is desirable to recycle this amount of condensate to the washing cooler in the gas producing system. The substances it contains, such as tar, etc., are therefore fed back into the raw gas, thus avoiding any losses.

At the point where line 13 branches off, a separator, which is not shown, can be provided in line 12 so that only water is carried out through line 13, but all substances, such as tar, etc., are carried out with the necessary amount of water through line 15.

The expansion tank 4 with purging line 14 remains out of operation, since the amount of $H_2S$ that is dissolved in the condensate being fed to the circuit through line 15 amounts to only about 6 $Nm.^3/h$. This additional amount of hydrogen sulfide which is put into the clean gas when it is driven out in the saturator 3 is negligible considering that the hydrogen sulfide remaining in the clean gas when it emerges from the desulfurization amounts to only 90 $Nm^3/h$.

The amount of condensate that is kept in circulation is 530 $Nm.^3/h$. and it is heated up to 155° C. in condenser 2. In the saturator the circulating liquid cools down to 113° C. and after make-up condensate is added through line 15, it has to be cooled down to 80° C. in heat exchanger 17, in order to sustain the required temperature difference in condenser 2. The heat removed in heat exchanger 17 can be used, if desired, for the heating of make-up water.

The following balances result:

Water balance

| Input: | Kg./h. |
|---|---|
| Water vapor in the raw gas | 68,400 |
| Formed in desulfurization | 1,374 |
| | 69,774 |

| Output: | Kg./h. |
|---|---|
| Water vapor in clean gas | 40,840 |
| Condensate removed | 28,934 |
| | 69,774 |

Water vapor loss=68,400−40,840=27,560 kg./h.

Heat balance with reference to $H_u$

| Input: | Kcal./h. |
|---|---|
| Heating value heat of the raw gas including hydrocarbons and $NH_3$ | $365.90 \times 10^6$ |
| Sensible heat of the raw gas | $9.62 \times 10^6$ |
| Sensible heat of the vapor | $4.94 \times 10^6$ |
| Brought in with $SO_2+N_2$ | $2.50 \times 10^6$ |

| Output: | |
|---|---|
| Heating value heat of the clean gas including hydrocarbons and $HH_3$ | $356.10 \times 10^6$ |
| Sensible heat of the clean gas | $8.69 \times 10^6$ |
| Sensible heat of the vapor | $2.65 \times 10^6$ |
| | $367.44 \times 10^6$ |
| Heating value heat of the sulfur that is produced | $7.35 \times 10^6$ |
| | $374.79 \times 10^6$ |

Heat loss, $8.17 \times 10^6$ kcal./h.=2.13% of the heat input

The amounts of heat which are lost to the outside with the condensate removed through line 13 and in the heat exchanger 17 originate largely from the heat of evaporation of the water vapor contained in the raw gas. The heat of evaporation figures do not appear in the heat balance relating to the lower heating value $H_u$ and cannot be utilized, either, in a gas turbine.

EXAMPLE 2

In the countercurrent distillation of coal under pressure, approximately 96% of the coal sulfur passes into the gas and 4% into the ash. The sulfur in the raw gas consists of 95% $H_2S$. The rest is organically bound sulfur of which about 1.5% is contained in the gas and 3.5% in the tar, oil and benzine.

The raw gas (line 101 of FIG. 6), after production, is available under 21 ata. of pressure and 520° C. and has the following analysis:

| | Percent by volume |
|---|---|
| $CO_2$ | 13.0 |
| $H_2S$ | 1.0 |
| CnHm | 0.2 |
| CO | 15.8 |
| $H_2$ | 25.0 |
| $CH_4$ | 5.0 |
| $N_2$ | 40.0 |

180,000 $Nm.^3/h$. of dry raw gas also carry 21.6 t./h. of water vapor, 7.2 t./h or tar, oil and benzine, 720 kg./h. of $NH_3$ and about 720 kg./h. of other hydrocarbons such as phenols and fatty acids. The raw gas with an enthalpy of $51.24 \times 10^6$ kcal./h. is washed in washing cooler 102 with 68.4 t./h. of condensate of 100° C. The raw gas leaves the washing cooler with an enthalpy of $54.6 \times 10^6$ kcal./h. at 161° C. and 21 ata. and saturated with 68.4 t./h. of water vapor. 21.6 t./h. of excess water leaves the washing cooler 102 through line 105 at 161° C.

The saturated raw gas is cooled in the indirct cooler 119 with 493 t./h. of recirculated water (line 120) from 161° C. to 143° C. at 20.6 ata., the water being thereby heated from 115° C. to 151° C. The residual heat is carried away at 140° C. with 32.4 t./h. of produced condensate (line 121) and distributed to lines 122 and 123.

If no waste water is to be discharged, for example, a portion is drawn from this condensate (line 123) corresponding, at 21.6 t./h., to the amount of water vapor in the raw gas input, and containing about 1 g./l. of $H_2S$, 10 g./l. of $CO_2$ and 8 g./l. of $NH_3$. For deacidification, this condensate is brought to ebullition in stripper 108 by reducing the pressure, reboiled with $0.32 \times 10^6$ kcal./h. from the condensate of washing cooler 102 (line 105) and the vapors are re-washed with 0.55 t./h. of added water of 20° C. from line 124. 22.15 t./h. of deacidified condensate is pumped through line 126 into the saturator 113. The raw gas is cooled to 116° C. at 20.4 ata. in the reboiler 130 that follows, $14.1 \times 10^6$ kcal./h. being fed by the absorption solution (line 131) to the regenator 142 and $2.55 \times 10^6$ kcal./h. being returned with 22 t./h. of produced condensate (line 135) at 116° C. to the washing cooler circuit.

Finally the gas is cooled from 116° C. to 30° C. in the indirect final condenser with 158 t./h. of recirculating water (line 134), 14 t./h. of condensate being produced and the recirculating water being heated from 20° C. to 106° C.

The raw gas in line 137 is delivered at 30° C. to the absorber 138 where it is subjected to a selective short-time washinng for $H_2S$ with 225 t./h. of absorption solution, 95% of the $H_2S$ and the same amount of $CO_2$ being washed out. An aqueous solution of alkali salts of low amino acids such as glycocoll, alanine, and the like, which is commercially available under the name "Alkazid," serves as the absorption solution.

The charged absorption solution is preheated in heat exchanger 141 and, after a reduction of pressure, is fed in line 140 to the regenerator where 1,710 $Nm.^3/h$. of $H_2S$ and 1710 $Nm.^3/h$. of $CO_2$ are driven out with $14.1 \times 10^6$ kcal./h. of heat. The quantity of the acid gases from the regenerator 142 is here very great in comparison with the amount from the stripper 108, so that they can be delivered together through line 143 for further processing, in a Claus system for example.

After the short-time washing for $H_2S$, 176,580 Nm.³/h. of clean gas is produced, at 30° C. and 19.6 atmospheres, with the following analysis:

|  | Percent by volume |
|---|---|
| $CO_2$ | 12.05 |
| $H_2S$ | 0.05 |
| CnHm | 0.20 |
| CO | 16.15 |
| $H_2$ | 25.55 |
| $CH_4$ | 5.10 |
| $N_2$ | 40.80 |

In the saturator 113, 176,580 Nm.³/h. of clean gas is sprinkled with recirculating water and heated, saturated with condensate and make-up water, and any remaining light hydrocarbons are evaporated. In the first stage the gas is heated from 30° C. to 94° C. with 158 t./h. of recirculating water (line 134) and saturated with 6 t./h. of water (line 127).

The circulating water is thus cooled to 61.5° C. and is fed to a cooler 146, where it is further cooled to 20° C., so that for the final cooling in the heat exchanger 133 there is available a 10° C. temperature difference which is sufficient for the heat transfer.

The clean gas, saturated at the prevailing pressure and temperature, enters the second stage of the saturator and is scrubbed with 493 t./h. of circulating water (line 120), which cools it from 151° C. to 115° C., the water being pumped back into the indirect cooler 119. The amount of heat transmitted is sufficient to evaporate in the saturator 113 22.15 t./h. of deacidified condensate supplied through line 126 as well as 14.05 t./h. of additional water and light hydrocarbons supplied through line 112. The clean gas leaves the saturator 113 at 141° C. at 19.6 ata. containing 36.2 t./h. of water vapor, and in the heat exchanger 148 is heated to 350° C., being expanded in the turbine 151 from 19.4 ata. to 9 ata. thereby producing work. The discharge temperature is 190° C. The clean gas is scrubbed at 9 ata. pressure in the tar saturator 115 with heavy hydrocarbons (line 114).

The non-evaporated portions of tar (line 116) are mixed with solids and tar from the separator 106 (line 117) and returned to the gas production system (not shown) where they are cracked into low hydrocarbons. In line 153, the desulfurized gas is available at 9 ata. pressure for example for a gas-steam-power process.

The following balances result:

Water balance

| Input: | T./h. |
|---|---|
| Water vapor in the raw gas | 21.6 |
| Additional water (154) | 14.6 |
|  | 36.2 |
| Output: Water vapor in clean gas | 36.2 |

Thus, 14.6 t./h. of water were evaporated.

Heat balance: (with reference to $H_u$)

| Input: | Kcal./h. |
|---|---|
| Heating value heat of the raw gas including hydrocarbons and ammonia | $365.9 \times 10^6$ |
| Sensible heat of the raw gas | $33.0 \times 10^6$ |
| Sensible heat of the water vapor | $5.3 \times 10^6$ |
| Sensible heat of the make-up water | $0.3 \times 10^6$ |
|  | $404.5 \times 10^6$ |

| Output: |  |
|---|---|
| Heating value heat of the clean gas including hydrocarbons and ammonia | $356.1 \times 10^6$ |
| Heating value heat of the $H_2S$ washed out | $9.8 \times 10^6$ |
| Sensible heat of the clean gas | $8.3 \times 10^6$ |
| Sensible heat of the water vapor | $2.3 \times 10^6$ |
|  | $376.5 \times 10^6$ |

| Difference: | Kcal./h. |
|---|---|
| Minus heat required for $H_2S$ washing | $14.1 \times 10^6$ |
| Heat losses | $13.9 \times 10^6$ |
| Minus losses due to water evaporation | $7.7 \times 10^6$ |
| Actual heat losses | $6.2 \times 10^6$ |

This is 1.5% of the input heat. This lost heat is carried away in condenser 146 by cooling water.

Sulfur balance

| Input: | Percent |
|---|---|
| As $H_2S$ in the raw gas | 95 |
| As organically bound sulfur in the raw gas | 1.5 |
| Organic sulfur bound in the hydrocarbons | 3.5 |
|  | 100 |

| Output: |  |
|---|---|
| Production of $H_2S$ (line 143) | 90 |
| As organically bound sulfur in the clean gas including hydrocarbons | 5 |
| As $H_2S$ in the clean gas | 5 |
|  | 100 |

It will be appreciated that the instant specification and examples are set forth by way of illustration and not limitation, and that various modifications and changes may be made without departing from the spirit and scope of the present invention.

What is claimed is:

1. In the desulfurization of compressed hot sulfur-containing raw gas saturated with water vapor and containing hydrogen sulfide and produced by gasifying coal or liquid hydrocarbons, wherein the raw gas is cooled to produce condensate and is washed with an absorption agent to remove the sulfur therefrom and leave substantially sulfur-free gas, the improvement which comprises cooling the raw gas prior to desulfurization by heat exchange with condensate produced from said raw gas, the heated condensate resulting from said heat exchange being contacted with clean gas leaving said desulfurization so that volatile matter in said condensate are thereby at least partially revaporized and added to the clean gas.

2. Process according to claim 1, wherein the desulfurization is effected at a temperature of about 20 to 160° C. and the raw gas is cooled prior to desulfurization to a temperature no more than about 10° C. above the operating temperature of desulfurization and is separated from the condensate.

3. Process according to claim 1, wherein the raw gas is cooled below the operating temperature of desulfurization and after separation of the condensate is reheated prior to desulfurization by indirect heat exchange.

4. Process according to claim 1, wherein the absorption agent is heated to a temperature above the temperature reached in the cooling of the gas to produce condensate.

5. Process according to claim 1, wherein the sulfur-containing absorption agent after absorption is regenerated by heat exchange from at least one of (a) the condensate circuit by saturators and condensers and (b) the hot raw gas.

6. Process according to claim 1, wherein the cooling of the raw gas is performed in at least two stages, the self-condensate being placed in direct heat exchange with the hot raw gas in the first stage, and wherein the hot condensate prior to contact with the clean gas is desulfurized by stripping with steam or sulfur-free gas.

7. Process according to claim 1, wherein the hot raw gas is cooled in at least one stage by indirect heat exchange with said condensate, the condensate separated from the indirectly cooled raw gas being purged and being added at least in part to the condensate circulating as indirect coolant.

8. Process according to claim 1, wherein the raw gas is passed through a plurality of heat exchanges on its way to being washed with absorption agent, condensate being formed upon cooling said raw gas, each condensate being used as a heat exchange liquid in another step in the process, the clean gas after sulfur removal being contacted with absorption agent to remove from said agent some of the volatizable liquid contained therein.

9. Process according to claim 1, wherein the condensate is permitted to stratify and form a hydrocarbon layer which is separated and brought into contact with the clean gas so as to be vaporized therein at least in part.

10. Process according to claim 1, wherein the absorption agent is water or an organic solvent and washes the gas at a temperature up to about 160° C.

11. Process according to claim 1, wherein the absorption agent comprises an aqueous solution of alkali arsenite and washes the gas at a temperature of about 60 to 160° C., the solution thereafter being aerated to effect regeneration and thereby being cooled, and then being heated back to absorption temperature by heat exchange with the raw gas or hot condensate.

12. Process according to claim 1, wherein the absorption agent comprises an alkaline solution which washes the gas at a temperature of about 20 to 160° C. and the charged absorption solution being purged and thereby regenerated by indirect heat exchange with hot raw gas or condensate.

13. Process according to claim 12, wherein the absorption agent comprises an alkylamine or alkylolamine optionally admixed with water or an aqueous solution of an alkali salt of a weak organic or inorganic acid.

14. Process according to claim 12, wherein the absorption agent comprises an aqueous solution of an alkali salt of an amino acid and washes the gas at a temperature of about 20 to 60° C.

15. Process according to claim 1, wherein the gas from which the sulfur is to be removed contains hydrogen sulfide, and sulfur dioxide is added to the raw gas which is subjected to a liquid phase treatment to effect sulfur removal through reaction between the hydrogen sulfide and sulfur dioxide to form sulfur.

16. Process according to claim 15, wherein the liquid phase treatment comprises contact with molten sulfur at a temperature of about 120 to 160° C.

17. Process according to claim 15, wherein the liquid phase treatment comprises contact with an organic solvent at a temperature up to about 160° C., a partial stream of which is regenerated by mechanical separation of the sulfur and recycled for washing of additional gas.

18. Process according to claim 1, wherein the condensate before its heat exchange with hot raw gas is cooled by an additional indirect heat exchange, thereby increasing the temperature differential between gas and condensate.

19. Process according to claim 1, wherein the cooled raw gas coming from the heat exchange with the condensate is further cooled by an additional indirect heat exchange.

References Cited
UNITED STATES PATENTS

| 1,848,156 | 3/1932 | Bönnemann | 423—234 |
| 3,161,461 | 12/1964 | Deal et al. | 423—228 |
| 3,266,866 | 8/1966 | Bally et al. | 423—228 |

EARL C. THOMAS, Primary Examiner

S. B. SHEAR, Assistant Examiner

U.S. Cl. X.R.

55—73; 423—223, 574